July 14, 1925.

L. FONTAINE

DUMPING VEHICLE

Filed March 10, 1924

1,546,340

Witnesses:

Inventor:

Patented July 14, 1925.

1,546,340

UNITED STATES PATENT OFFICE.

LÉON FONTAINE, OF BOULOGNE, FRANCE, ASSIGNOR TO ETABLISSEMENTS DEWALD, OF BOULOGNE, FRANCE, A FRENCH COMPANY.

DUMPING VEHICLE.

Application filed March 10, 1924. Serial No. 698,312.

*To all whom it may concern:*

Be it known that I, LÉON FONTAINE, a citizen of the French Republic, and resident of Boulogne-sur-Seine, 86 Rue Denfert Rochereau, France, have invented certain new and useful Improvements in Dumping Vehicles, of which the following is a specification.

The present invention relates to tipping apparatus for use with vehicles, and comprises a frame, adapted to be mounted upon vehicles and designed for the transport and automatic discharge of solid blocks, such as blocks of building material, metal ingots and the like.

The accompanying drawing shows, by way of example, one method of carrying the invention into practice.

Figure 1:
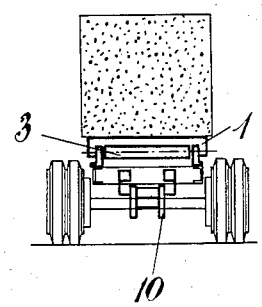
Fig. 1 is an end view of the tipping apparatus mounted on the chassis of a motor vehicle, and in the position for road transport.
Figure 4:
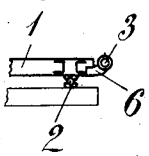
Fig. 4 shows a modified constructional detail referring to the position of the discharging roller.
Figure 2:
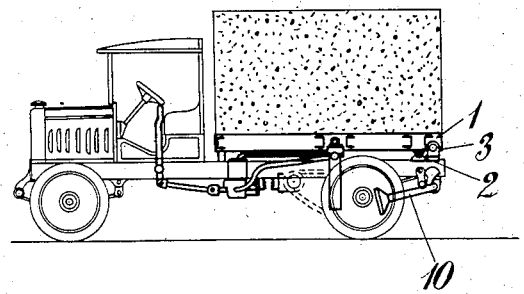
Fig. 2 is a side elevation of the tipping apparatus mounted on the chassis of a motor vehicle, and in the position for road transport.
Figure 3:
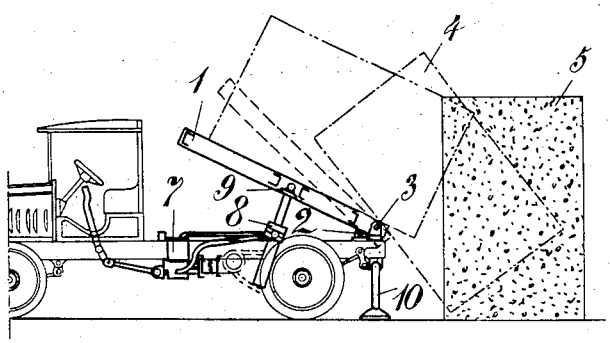
Fig. 3 is a side elevation of the tipping apparatus during and at the end of the tipping operation.

The tripping apparatus comprises a frame 1, pivotally mounted at one end on pivotal means 2, so arranged that, on exerting an upward thrust at a suitable point under the frame, the set frame tips, and comes into a more and more inclined position with reference to a horizontal plane until the load slides off towards the ground.

3 is a roller so mounted near the pivot 2 of the frame 1, that when the latter reaches an appropriate predetermined angle the periphery of the roller is tangential with respect to the plane in which the load coming off the frame slides.

The load sliding over the frame 1, by reason of its own weight comes against the periphery of the roller 3 and rolls over the same, tipping over and occupying the successive positions 4 and 5.

It is to be understood that without departing from the scope of the invention, the periphery of the roller 3, might come above the plane of sliding motion from the frame 1, with respect to an appropriate and predetermined position of the frame. The roller 3 might also be mounted on the frame 3, as shown in the modified construction 6, the periphery of the roller 3 being tangential to or above the plane of sliding from the frame 1.

This roller may be dispensed with, without affecting adversely the operation of the apparatus, or it may be replaced by pulleys.

In the drawing accompanying this specification, the tipping of the frame 1 is effected by means of a compression pump 7, operating a hydraulic jack 8, supported on the chassis of the trolley and exerting an upward force on the frame at 9.

A suitably located support 10, limits the pressure on the spring of the vehicle during the discharge of the load from the tipping apparatus.

It is to be clearly understood that a pneumatic jack or a mechanical or any other device might be employed, for tripping the frame without in any way departing from the principle of the invention. The drawing accompanying this specification simply gives an indication of the operation of the apparatus and is not to be held to limit its applications in any way.

What I claim as my invention and desire to secure by Letters Patent of the United States of America is:—

The combination with a vehicle having a framework or chassis, a tipping platform for supporting a load pivotally mounted on said framework, a roller rotatably mounted on said framework, said roller having its periphery located below the horizontal plane of the floor of said platform when said platform is in its non-discharging position and the periphery of said roller projecting above the plane of said floor when said platform is moved to discharging position.

In testimony whereof, I have signed my name to this specification at Paris, Friday, this 29th day of February 1924.

LÉON FONTAINE.